(12) United States Patent
Singh et al.

(10) Patent No.: US 6,324,621 B2
(45) Date of Patent: *Nov. 27, 2001

(54) DATA CACHING WITH A PARTIALLY COMPRESSED CACHE

(75) Inventors: Shanker Singh, Morgan Hill; Joe-Ming Cheng, Cupertino, both of CA (US); Brent Cameron Beardsley, Tucson, AZ (US); Dell Patrick Leabo, Tucson, AZ (US); Forrest Lee Wade, Tuscon, AZ (US); Michael Thomas Benhase, Tucson, AZ (US); Marc Ethan Goldfeder, Tucson, AZ (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/090,028

(22) Filed: Jun. 10, 1998

(51) Int. Cl.$^7$ ................................................... G06F 12/00
(52) U.S. Cl. ................. 711/129; 711/171; 711/134; 711/159; 710/68
(58) Field of Search ............................... 711/129, 113, 711/171, 133, 134, 136, 159, 160; 710/68

(56) References Cited

U.S. PATENT DOCUMENTS

| | | | |
|---|---|---|---|
| 5,237,460 | * 8/1993 | Miller et al. | 360/8 |
| 5,450,562 | 9/1995 | Rosenberg et al. | 395/446 |
| 5,490,260 | * 2/1996 | Miller et al. | 711/100 |
| 5,537,588 | * 7/1996 | Engelmann et al. | 707/202 |
| 5,574,952 | * 11/1996 | Brady et al. | 710/68 |
| 5,812,817 | * 9/1998 | Hovis et al. | 711/173 |

OTHER PUBLICATIONS

"Improving Direct–Mapped Cache Performance by the Addition of a Small Fully–Associative Cache and Prefetch Buffers," Norman P. Jouppi, *IEEE*, 364–373, 1990.

"CE 297 Independent Study Report Effective CACHE Design Alternatives," Joe–Ming Cheng and Bruce Durgan, Mar. 20, 1992.

* cited by examiner

Primary Examiner—Matthew Kim
Assistant Examiner—Matthew D. Anderson
(74) Attorney, Agent, or Firm—Sawyer Law Group LLP; Randall J. Bluestone

(57) ABSTRACT

Aspects for caching storage data include partitioning a storage cache to include a compressed data partition and an uncompressed data partition, and adjusting a size of the compressed data partition and the uncompressed data partition for chosen performance characteristics. A data caching system aspect in a data processing system having a host system in communication with a storage system includes at least one storage device and at least one partially compressed cache. The at least one partially compressed cache further includes an uncompressed partition and a compressed partition, where the compressed partition stores at least a victim data unit from the uncompressed partition.

32 Claims, 4 Drawing Sheets

| | %L3 | EFF.GB | RH | DSTG | BASE RT | MAX IO |
|---|---|---|---|---|---|---|
| (a) | 100 L3 | 4.000 | .83 | 0 | 2.9 | 9830 |
| | L4 | 0 | 0 | 0 | | |
| | HDD | | .17 | .041 | | |
| (b) | 75 L3 | 3.158 | .81 | 0 | 2.8 | 10530 |
| | L4 | 3.158 | .04 | .199 | | |
| | HDD | | .15 | .038 | | |
| (c) | 50 L3 | 2.222 | .79 | 0 | 2.6 | 11190 |
| | L4 | 6.667 | .08 | .226 | | |
| | HDD | | .13 | .049 | | |
| (d) | 25 L3 | 1.176 | .72 | 0 | 2.5 | 10620 |
| | L4 | 10.588 | .17 | .295 | | |
| | HDD | | .11 | .058 | | |

| | %L3 | EFF.GB | RH | DSTG | BASE RT | MAX IO |
|---|---|---|---|---|---|---|
| (a) | 100 L3 | 8.000 | .87 | 0 | 2.7 | 10770 |
| | L4 | 0 | 0 | 0 | | |
| | HDD | | .13 | .039 | | |
| (b) | 75 L3 | 6.315 | .85 | 0 | 2.2 | 13590 |
| | L4 | 6.315 | .04 | .166 | | |
| | HDD | | .11 | .039 | | |
| (c) | 50 L3 | 4.444 | .83 | 0 | 2.2 | 13440 |
| | L4 | 13.334 | .07 | .184 | | |
| | HDD | | .10 | .040 | | |
| (d) | 25 L3 | 2.353 | .79 | 0 | 2.2 | 13020 |
| | L4 | 21.177 | .11 | .225 | | |
| | HDD | | .10 | .048 | | |

DATA CACHING WITH A PARTIALLY COMPRESSED CACHE

FIELD OF THE INVENTION

The present invention relates generally to storage caches, and more particularly to partially compressed storage caches.

BACKGROUND OF THE INVENTION

As processing speeds of computer systems continue to increase, the ability to efficiently retrieve data from memory remains vital. The use of memory caches has been effective in compensating for speed mismatches between two levels of storage access, e.g., between a processor and main memory. Caches generally provide higher speed memory storage for recently/frequently used data in a computer system.

Improving the performance and utilization of caches remains an important aspect of computer system design. Typically, cache organizations and algorithms attempt to utilize the spatial and temporal localities of the storage access. Success in caches is usually measured by the hit ratio (i.e., the number of times that the needed data is found in the cache), as well as average access time (i.e., average time to locate and retrieve a piece of information and return it for processing), maximal throughput (i.e., maximal rate of data transfer), etc. At times, attempts to achieve better performance involve changes to the cache organization, which often improve hit ratios and access times at a slight expense of the maximal throughput due to cache replacing overhead.

For example, one typical method of improving performance by increasing the hit ratio involves expanding the size of the cache. Unfortunately, as the cache size is increased, an equivalent increase in the hit ratio percentage is not always achieved. For example, doubling a 4 GB (gigabytes) cache with a 75% hit ratio to 8 GB does not result in a doubling of the hit ratio. While a small percentage of improvement in the hit ratio occurs, the doubling in size results in considerable cost expenses.

Alternatively, with a fully compressed cache, an increase in storage capacity is achieved without increasing the cache size. When the compressed cache is used in a read-only environment, normally few problems in data integrity result. However, when used in an environment of changing data, significant problems result, mainly due to the need to have random access to the compressed data in the cache. Forming smaller, uniform-sized chunks within the compressed cache is sometimes used to allow more random access to portions of data. However, further complications in updating are created, since the compressed data may not elegantly fit within each chunk due to the size variations in the data. Further, compressing small chunks usually results in lower compression.

Accordingly, a need exists for a cache organization and algorithm that achieves results at least as effective as increasing a cache's size without the concomitant expense incurred by size increases.

SUMMARY OF THE INVENTION

The present invention meets these needs through a partially compressed cache organization. A method aspect for caching storage data includes partitioning a storage cache to include a compressed data partition and an uncompressed data partition, and adjusting the compressed data partition and the uncompressed data partition for chosen performance characteristics, including overall cache size. A data caching system aspect in a data processing system having a host system in communication with a storage system includes at least one storage device and at least one partially compressed cache. The at least one partially compressed cache further includes an uncompressed partition and a compressed partition, where the compressed partition stores at least a victim data unit from the uncompressed partition.

With the present invention, alternative caching organizations and algorithms are introduced that allow for dynamically adjusting partition sizes of uncompressed and compressed cache data according to hit-ratio, response time, compression ratios, and throughput (max IO) objectives. Further, the utilization of sub-partitioning a cache in order to achieve a partially compressed cache is readily applicable in multi-level caching of storage subsystems. In addition, the partially compressed cache organization achieves improved performance on par with increasing a cache's size without incurring the cost expense of cache size increase. These and other advantages of the aspects of the present invention will be more readily understood in conjunction with the following detailed description and accompanying drawings.

BRIEF DESCRIPTION OF THE DRAWINGS

FIGS. 2 and 3 present performance modeling results that illustrate response time changes and maximum IO values with varying levels of compression of the storage cache of FIG. 1.

DESCRIPTION OF THE INVENTION

The present invention relates to partially compressed data caching. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
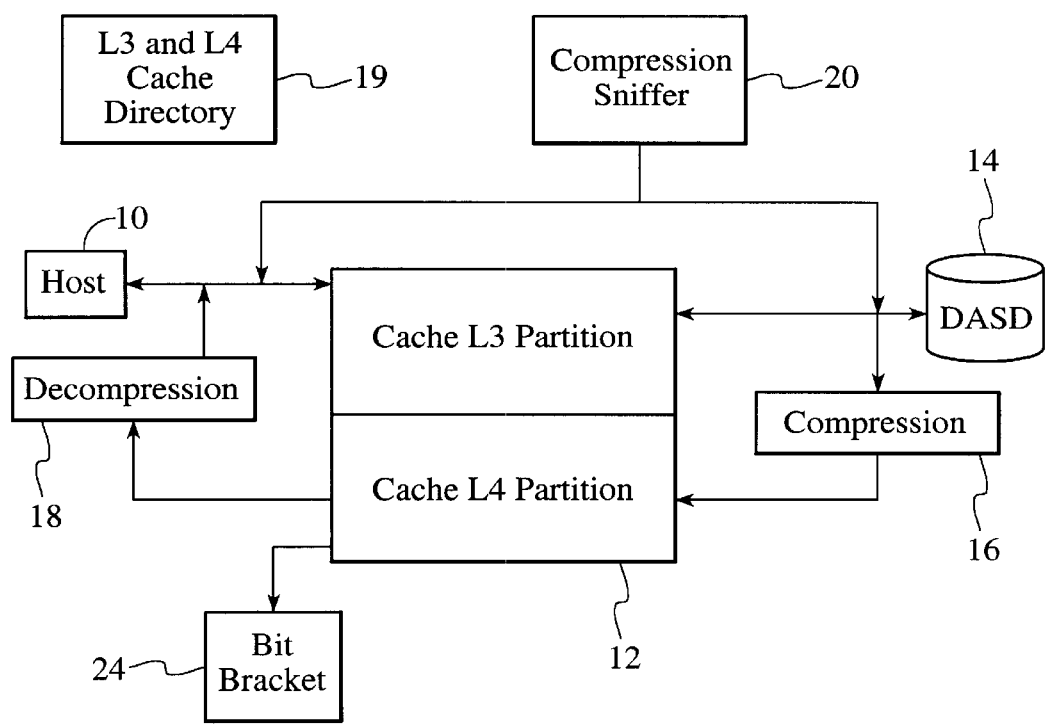
FIG. 1 illustrates a block diagram of a data processing system arrangement that utilizes caching in accordance with the present invention.

FIG. 1 illustrates a block diagram of a data processing system arrangement that utilizes caching in accordance with the present invention. Included as a part of the system are a host system 10, e.g., a central processing unit (CPU), storage cache 12, and storage (DASD, direct access storage device) 14. As in typical similar arrangements, storage cache 12 is used to provide quicker access to storage data than storage 14, e.g., on the order of microseconds per access, rather than milliseconds. In contrast to typical caching arrangements, however, the storage cache 12 in accordance with the present invention optimizes cache organization and algorithms dynamically to achieve maximum performance without requiring additional storage cache. It should be appreciated that although the discussion focuses primarily on storage controller cache applications, the invention is equally applicable to CPU cache and other caching applications, as is well appreciated by those skilled in the art.

Through the present invention, storage cache 12 is partitioned into at least two partitions, partition L3 and partition L4. Preferably, one partition, e.g., partition L3, stores uncompressed data, while a second partition, e.g., partition L4, stores compressed data. Suitably then, a compressor unit 16 and decompressor unit 18 are also included in the system of FIG. 1. For illustrative purposes, partitions L3 and L4 are shown as distinct partitions in the storage cache 12. However, this is demonstrative of the logical appearance of the partitions. In a preferred embodiment, the partitions L3 and L4 are part of the same physical memory, so that compressed and uncompressed data are intermingled in the storage cache 12.

By way of example, with a compression ratio of about 3:1, and storage cache 12 having a total size of 4 GB, partitioning the storage cache 12 into two partitions of 2 GB each results in a logical size of 8 GB for storage cache 12 (2 GB uncompressed and 2 GB compressed to store 6 GB worth of data). The partition L3 suitably stores the 2 GB of uncompressed data (unit) lines, while the partition L4 stores the 2 GB of compressed data (unit) lines. For purposes of this disclosure, a "line" suitably refers to a line cache replacement unit (or a replaceable data unit) in a cache. Thus, for storage cache 12, a cache line suitably refers to a storage device 14 record, track, or a fraction of a track.

With partitions L3 and L4 occupying the same storage cache 12, preferably a L3 and L4 cache directory 19 tracks the status of compressed and uncompressed locations/data blocks within the storage cache 12 by storing a listing of the uncompressed blocks and a listing of compressed blocks, with the formation and updating of the directory achieved according to methods well understood by those skilled in the art. Of course, the listings could be provided as two separate directories, and a third directory (not shown) may also be included to store a listing of empty blocks, if desired.

In terms of data flow in the storage cache 12, preferably partition L3 stores data that is changing. When new data is added to partition L3, preferably a least recently used (LRU) algorithm is employed to make room for the new data by removing the least recently used data, which takes advantage of the storage access temporal locality and determines which uncompressed line becomes the removed data/victim line, as is well-known to those skilled in the art. Suitably, the victim data unit, i.e., victim line of a record, track, or fraction of a track, of partition L3 is compressed through compressor unit 16 and written to the same location in the storage cache 12. With the victim line of partition L3 compressed and stored in partition L4, the original uncompressed location now stores the compressed line and opens two empty compressed blocks in the storage cache 12. Directory 19 is suitably updated to indicate the change in status of the block from uncompressed (i.e., part of partition L3) to compressed (i.e., part of partition L4). The uncompressed victim line is also preferably written/destaged to storage 14. If L3 and L4 are provided as separate physical memory devices, and the L4 physical distance and interface is different than L3, then compressed data to L4 is physically moved to the empty slot in L4, and the directory of L4 stored in L3 or L4 is appropriately updated.

The exact compressed data size is usually unpredictable. Within a class of data type and application, the compressed size statistics are usually fairly stable. Varying methods exist for estimating space allocation for partition L4 (e.g., for a victim line from partition L3 or for prefetched data from storage 14). A compression sniffer 20 is useful for trail compression for a data line which has been seen once. Suitably, a sniffer is a device and/or software routine that monitors data lines as they are transferred through the caching system, i.e., that monitors the 'trail' the data lines travel, to identify how the data lines are compressed. Thus, the compression sniffer/trail compression unit 20 suitably gives actual compressed size. If a compression sniffer is not available, alternative methods for estimating space allocation include: assigning enough space to hold the worst case expanded data (e.g., 1.125 times the line size), storing the compressed data, and reclaiming the left over space; allocating space based on a priori compression statistics, e.g., using 2 sigma the compression statistics (or other threshold) for allocation and keeping the overflow if compressed size is exceeded; or assigning the threshold (e.g., about 3:1) and merely dropping the compressed data if it does not fit (with the assumption that the data is destaged to DASD).

Partition L4 suitably uses a LRU replacement policy and compression weighted replacement (CWR) to determine its victim lines, which takes into account that data that is directly interpretable by human and machine usually compresses well and that data that can be compressed moderately well has a higher chance of being reused than data that does not compress well. The victim line of partition L4 may suitably be discarded/removed via a bit discarder mechanism 24, i.e., a 'bit bucket' or universal data sink, to make space in the storage cache 12 when new data is written to partition L4.

When a read attempt results in a read miss in partition L3 with a read hit in partition L4, partition L4 suitably passes the uncompressed line (decompressed through decompressor unit 18) to partition L3 and to the host system 10. The partition L4 entry for that line suitably becomes invalidated. When a miss occurs in both partitions L3 and L4, suitably the requested data is read back from storage 14 to the partition L3 for transfer to host system 10.

Commonly, the source block size is 512 Bytes or 1024 Bytes and a cache line, i.e., 2K or 4K Bytes, track, or half track, consists of multiple blocks, with a read or modify write to a specific block in a cache line done through the partition L3. However, a performance penalty may result if a read or modify write occurs to a specific block that is kept in the partition L4. The primary impacts are the extra reads and writes between L3 and L4 which consumes additional data bandwidth. Preferably, therefore, when the input block size is 1.5K, 2.0K Bytes or greater, the cache line contains only a single block. In this manner, more cache lines are able to be kept in partition L4, resulting in less transfers between partitions L3 and L4. For an adaptive compression algorithm, a block size of 2 KB allows a good compression region (i.e., about 3.0), since a block size of 512 B usually achieves less than 2.0 compression.

In addition to LRU replacement, the compression ratio, i.e., the ratio of uncompressed size/compressed size, is a factor in the cache replacement algorithm. Thus, the compression factor acts as a discrimination factor for cache replacement (the term discrimination factor being known commonly in Pattern Recognition (PR) research), with the objectives of the caching algorithm being a classification process that keeps the class of most useful data in the cache through some discrimination process (as less well-compressed data usually is used less often).

Suitably, the size of partitions L3 and L4 are adjusted according to cache size, storage device size, compression/ decompression hardware speed, and performance objectives, e.g., access time, response time, maximum rate of input and output required (MAX IO requirements), etc. With the use of dynamic partitioning, the storage cache 12 of the present invention realizes significant advantages over straight caching. FIGS. 2 and 3 present performance modeling results that illustrate response time changes and maximum IO values as adjustments are made to the percentage of the storage cache 12 that is compressed. The performance model of FIG. 2 suitably illustrates a storage cache 12 of size 4 GB, while the performance model of FIG. 3 suitably illustrates a storage cache 12 of size 8 GB, both used with a storage 14 of 360 GB and a compression ratio of about 3:1.

With reference to FIG. 2, when the entire storage cache 12 is used for uncompressed data storage, i.e., the partition L3 comprises 100% and the partition L4 comprises 0% of the storage cache 12, the base response time (BASE RT) is 2.9 ms (milliseconds) with a maximum IO per second (MAX IO) of 9830. With L3 at 75% and L4 at 25%, the response time is 2.8 ms, and the maximum IO is 10530. With L3 at 50% and L4 at 50%, the response time drops to 2.6 ms, and the maximum IO is 11190. With L3 at 25% and L4 at 75%, the response time is 2.5 ms, and the maximum IO is 10620.

With reference to FIG. 3, when L3 is 100%, and L4 is 0%, i.e., all 8 GB are uncompressed, response time is 2.7 ms and maximum IO is 10770. As the percentage changes, i.e., partition L3 goes from 75% to 50% to 25% and while partition L4 goes from 25% to 50% to 75%, the response time is 2.2 ms and the maximum IO decreases from 13590 to 13440 to 13020. The results of performance modeling, as illustrated in FIGS. 2 and 3, reveals that the partitioning of a 4 GB storage cache into two partitions of equal percentage for uncompressed and compressed data (i.e., FIG. 2,(c)) provides better response time and maximum IO than an 8 GB storage cache with 100% uncompressed data (i.e., FIG. 3,(a)). For these conditions, the response time for the 4 GB arrangement is 2.6 ms with a maximum IO of 11190, while the response time for the 8 GB arrangement is 2.7 ms with a maximum IO of 10770. Thus, the 50% partitioning approach provides even better performance gains for a 4 GB cache than merely doubling the size to 8 GB with no compression. FIGS. 2 and 3 further reveal that the most beneficial partition percentages are dependent on cache size. Thus, for the 4 GB cache, a 50% L3 and 50% L4 partitioning provides overall optimum performance. Contrastly, for the 8 GB cache, a 75% L3 and 25% L4 partitioning provides overall optimum performance.

Figure 4:
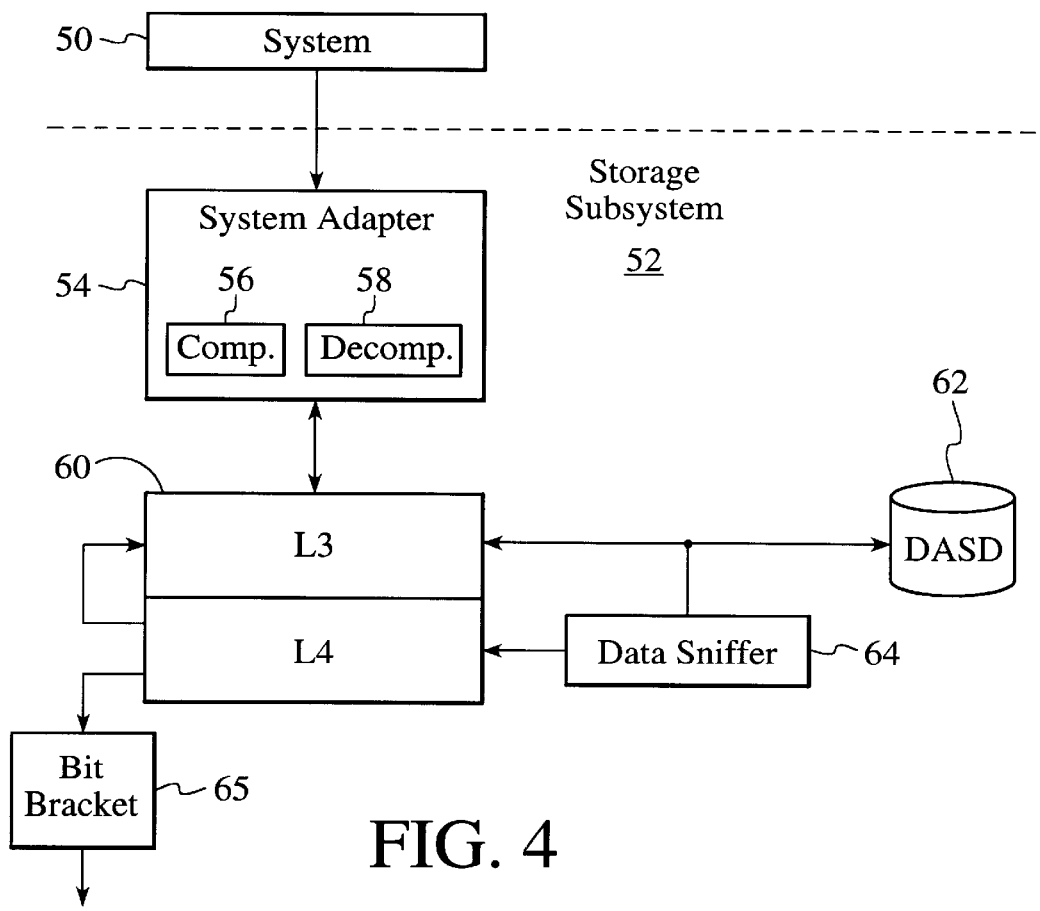
FIG. 4 illustrates an alternate arrangement of the system of FIG. 1 that realizes significant bandwidth advantages through the use of partial cache compression.

Improvements in performance that realizes significant bandwidth advantages through the use of the partitions L3 and L4 is achieved with an alternate arrangement of the system of FIG. 1, as illustrated in FIG. 4. In this alternate embodiment, a system 50 interfaces with a storage subsystem 52 via a system adapter 54. The system adapter 54 suitably includes compressor logic 56 and decompressor logic 58. Further included is storage cache 60 and storage 62 (e.g., DASD). Preferably, partition L3 of storage cache 60 includes a plurality of 'home areas', where each 'home area' refers to an uncompressed data block, as described with reference to FIG. 1. However, in contrast to the preferred embodiment, the system adapter 54 sends compressed data to these home areas at a preferred compression ratio, e.g., more than approximately 2:1. The portion of each home area required to store data varies depending upon the amount of data being compressed, of course, but will never exceed the entire home area due to the compression.

With the system adapter 54 sending compressed data to the storage cache 60, an effective increase in bandwidth for data transfer results by a factor dependent upon the compression ratio. For example, with a compression ratio of about 3:1, data transfer can now effectively occur at three times the normal transfer rate, since three times as much data is able to be transferred, e.g., a rate of 100 MB/s (megabyte/second) now appears as 300 MB/s. Of course, a similar increase in bandwidth may be realized for data transfers from partition L3 to storage 62, since the data being transferred from partition L3 has already been compressed.

In terms of data flow, again an LRU algorithm suitably determines which data from partition L3 becomes a victim line for storage in partition L4 with writing to storage 62, and similarly, which lines are victims from partition L4. The size of the blocks in partition L4 are smaller in comparison to the data block storage area/home areas of partition L3. Thus, a data sniffer 64 suitably determines whether a victim line from L3 will fit in partition L4. Compacting of data may occur in order to realize line transfer from L3 to L4. Data is suitably discarded from partition L4 via a bit bucket/discarder 65. When a hit occurs in partition L4, suitably the line is returned to partition L3 and to system adapter 54. The decompressor logic 58 suitably decompresses the data before being returned to system 50. If a miss occurs in both partitions L3 and L4, the data is returned from storage 62 to partition L3 and directly to system adapter 54 for decompression and return to system 50.

Figure 5A:
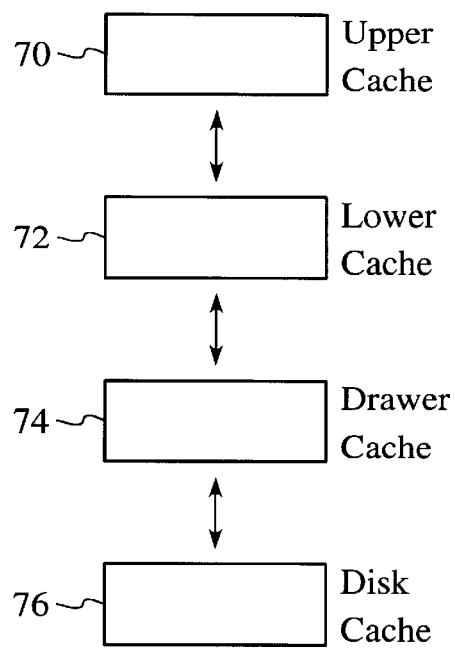
FIG. 5(a) illustrates a block diagram of typical multi-level caching.

The caching arrangement aspects of the present invention are further capably utilized in systems that comprise multiple levels of caching. By way of example, FIG. 5(a) illustrates a block diagram of typical multi-level caching, such as in a RAMAC storage system from IBM Corporation, Armonk, N.Y. An upper level cache 70 is shared among all of the lower level caches 72, each of which is shared among all of the drawer level caches 74, each of which is then shared among respective disk level caches 76. Conventionally, the LRU algorithm is employed at each of the levels. However, the addition of new data at the upper level cache 70 normally results in replacement of the data in each of the next lower cache levels, as well. Unfortunately, this results in duplication of cache lines, i.e., cache pollution, among the caches.

Figure 5B:
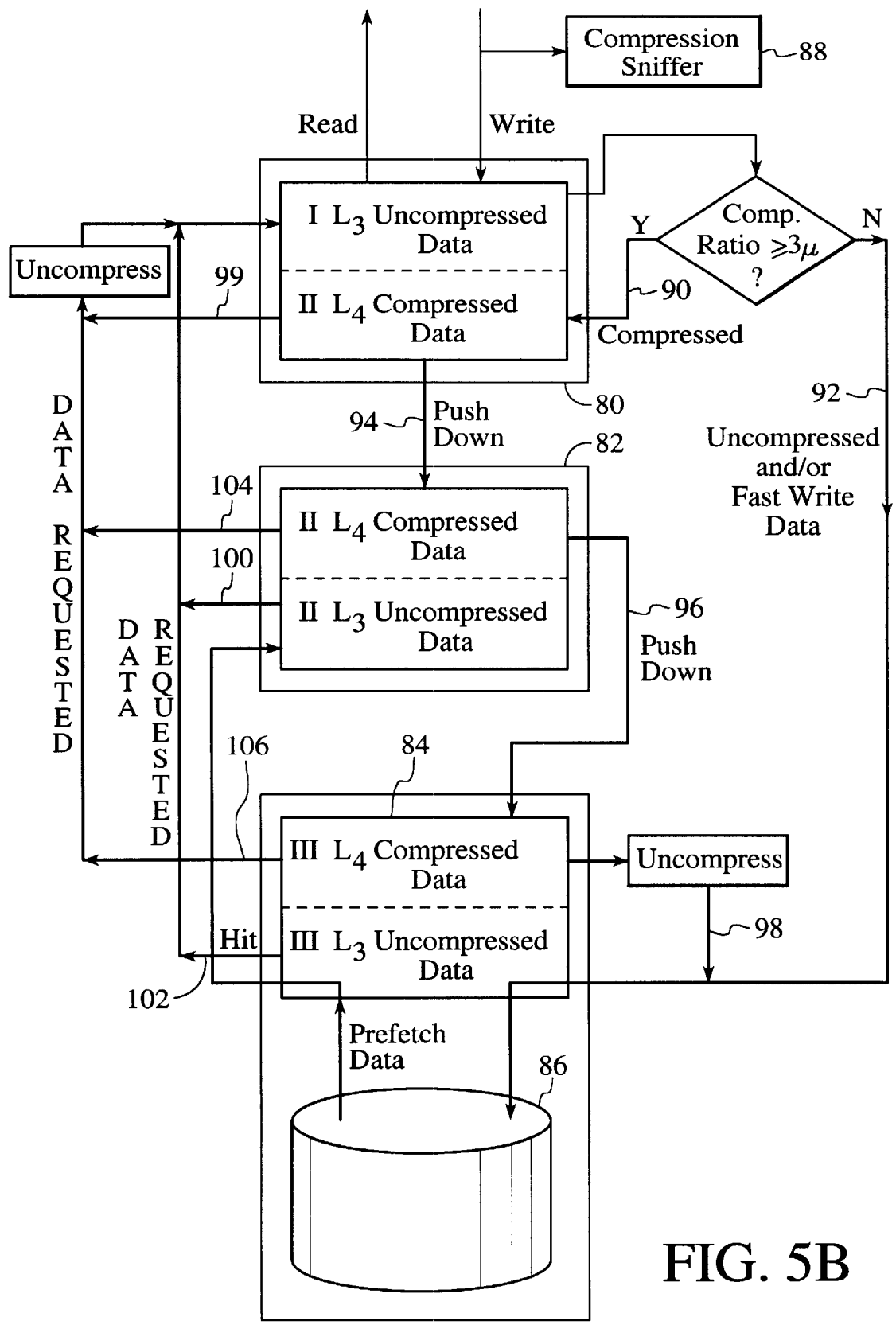
FIG. 5(b) illustrates a multi-level caching arrangement in accordance with a further aspect of the present invention.

In accordance with a further aspect of the present invention, a multi-level caching arrangement utilizes dynamic partitioning, as described with reference to FIG. 5(b). As shown in FIG. 5(b), each level of the multi-level caching arrangement employs dynamic partitioning of uncompressed and compressed data partitions. Thus, an upper, level one system cache 80 is partitioned into an uncompressed partition, IL3, and compressed partition, IL4. Similarly, a drawer level cache 82 comprises an uncompressed partition IIL3, and compressed partition IILL4, while a drive cache 84 associated with a DASD 86 includes a compressed partition IIIL4 and an uncompressed partition IIIL3. A compression sniffer 88 is further included and operates in a manner as previously described with reference to FIG. 1 to solve problems associated with compression ratio variability and prediction problems. Sizes of the partition L3 and partition L4 of each level are suitably adjusted dynamically to achieve desired performance characteristics, as described herein with reference to FIGS. 1–4.

The L3 of cache level 80 suitably stores data that is changing, while the L3 of 82 and 84 suitably is used to store pre-fetched uncompressed data. The pre-fetch data comprises the excessive amount of data read in many environments. Alternatively, a specific command to pre-fetch large blocks of data units, or purge a large block of data in the cache, or freeze a block of data in cache, may be employed as is well understood by those skilled in the art.

In terms of data flow, the victim data unit (i.e., tracks, records, or lines) chosen at top-level IL3 is compressed and then pushed to the top-level compressed partition IL4, represented by arrow 90. Alternatively, for compression ratio lower than the predetermined threshold or for a fast write operation, the IL3 victim data unit is suitably stored directly on DASD 86, represented by arrow 92. The victim data unit at each level of compressed partition L4 is pushed down to the next lower level compressed partition L4, i.e., the victim of IL4 is pushed down to IIL4 (arrow 94), and the victim of IIL4 is pushed down to IIIL4 (arrow 96). The victim of IIIL4 preferably is uncompressed(decompressed) and stored to DASD 86 (arrow 98). When a read data miss occurs in the IL3 partition, the missed data is preferably fed directly from either: compressed partition IL4 (arrow 99) after decompression; a lower level prefetch L3 (arrows 100 or 102); a lower level L4 (arrows 104 or 106) after decompression; or DASD 86 (arrow 102). The arrow 102 represents a preferred data flow. Of course, data may flow from DASD 86 in an alternate manner, if desired.

Thus, through the dynamic partitioning and data organization with multiple levels of caching as represented in FIG. 5(*b*), duplication of data among the cache levels is readily avoided, while the data requesting path is made faster. Further, retaining victim lines in the described manner creates better performance than normal methods which throw victim lines away.

Although the present invention has been described in accordance with the embodiments shown, one of ordinary skill in the art will readily recognize that there could be variations to the embodiments and those variations would be within the spirit and scope of the present invention. For example, although the embodiment of FIG. 1 is described as partitioning a single physical cache, the partitions are suitably capable of being achieved with separate physical memory devices. Of course, a greater performance penalty results for misses in L3 and hits in L4 when on separate memory devices. Accordingly, many modifications may be made by one of ordinary skill in the art without departing from the spirit and scope of the appended claims.

What is claimed is:

1. A method for caching data in a data processing system, the method comprising:

partitioning a storage cache to include a compressed data partition and an uncompressed data partition;

adjusting the compressed data partition and the uncompressed data partition for chosen performance characteristics, including overall cache size;

utilizing a predetermined compression ratio to form compressed data and storing the compressed data in the compressed data partition; and storing the compressed data from the uncompressed data partition in a same storage location as the uncompressed data partition in the storage cache.

2. The method of claim 1 wherein the performance characteristics further include cache partition ratios, a storage device size and performance objectives.

3. The method of claim 1 wherein a trail compression unit determines space allocation for data in the compressed data partition to avoid problems associated with compression ratio variability and prediction.

4. The method of claim 1 wherein the compressed data partition stores a victim data unit from the uncompressed data partition, the victim data unit comprising a track, record, or line of data.

5. The method of claim 4 wherein the victim data unit comprises least recently used data from the uncompressed data partition.

6. The method of claim 1 wherein the compressed data partition stores a pre-fetch data unit from a storage device.

7. The method of claim 1 wherein the predetermined compression ratio comprises a ratio of more than 2:1.

8. The method of claim 4 further comprising storing the victim data unit directly to storage when the trail compression unit determines a compression ratio falls below a given threshold.

9. The method of claim 6 wherein the storage device comprises a direct access storage device (DASD).

10. The method of claim 1 further comprising tracking a status of data lines in the storage cache with a directory to identify whether the data lines are compressed or uncompressed.

11. A data caching system in a data processing system, the data processing system including a host system in communication with a storage system, the data caching system comprising:

at least one storage device; and at least one cache coupled to the at least one storage device for caching data from the at least one storage device, the at least one cache partitioned to include a compressed partition and an uncompressed partition, wherein the compressed partition stores at least a victim data unit from the uncompressed partition in a same storage location as in the uncompressed partition.

12. The system of claim 11 wherein the storage system further comprises a compression sniffer coupled to the at least one cache to determine space allocation in the compressed partition.

13. The system of claim 11 wherein the at least one cache comprises an upper level cache of uncompressed data and at least one lower level cache of compressed data.

14. The system of claim 11 wherein the compressed partition further stores prefetch storage data.

15. The system of claim 11 wherein the victim data unit comprises least recently used data from the uncompressed partition.

16. The system of claim 11 wherein the storage system further comprises a compressor and a decompressor coupled to the at least one partially compressed cache.

17. The system of claim 15 wherein the compressor compresses the victim data unit at a ratio of more than 2:1.

18. A method for effectively increasing data transfer bandwidth between a host system and a storage system, the method comprising:

utilizing a system adapter in the storage system for storage data transfer, the system adapter including compression logic and decompression logic;

coupling at least one partially compressed cache to the system adapter, the at least one partially compressed cache comprising an uncompressed partition and a compressed partition, the compressed partition storing compressed data from the uncompressed partition in a same storage location in the at least one partially compressed cache; and transferring data through the compression logic to the uncompressed partition to effectively increase data transfer from the system adapter to the partially compressed cache by a factor corresponding to a compression ratio of the compression logic.

19. The method of claim 18 wherein the compression ratio comprises more a compression ratio of more than 2:1.

20. The method of claim 18 further comprising storing victim lines from the uncompressed partition in the compressed partition.

21. The method of claim 20 further comprising writing the victim lines to a storage device in the storage system.

22. A method for caching data in a multi-level caching arrangement of a data processing system, the method comprising:

partitioning each cache level to include a compressed data partition and an uncompressed data partition;

adjusting the compressed data partition and the uncompressed data partition of each cache level for chosen performance characteristics; and utilizing the compressed and uncompressed data partitions of each cache level to cache data from a storage device, the compressed partition storing compressed data from the uncompressed data partition in a same storage location as in the uncompressed data partition, wherein cache pollution is substantially avoided and a data requesting path becomes faster.

23. The method of claim 22 further comprising storing pre-fetched uncompressed storage data in the uncompressed data partition of each cache level.

24. The method of claim 23 further comprising compressing a victim data unit of an uncompressed data partition of a top level cache and storing the victim data unit in a compressed data partition of the top level cache.

25. The method of claim 24 further comprising utilizing a predetermined compression ratio to form compressed data for the compressed data partition.

26. The method of claim 24 further comprising utilizing a trail compression unit for estimating space allocation for data in the compressed data partition to avoid problems associated with compression ratio variability and prediction.

27. The method of claim 24 further comprising storing a victim data unit of the compressed data partition of one cache level in a compressed data partition of a next lower cache level.

28. The method of claim 27 further comprising decompressing a victim data unit of a compressed data partition of a lowest level cache for storage back in the storage device.

29. A data processing system comprising:

a host system, the host system performing accesses on storage data; and a storage system, the storage system coupled to the host system and storing the storage data, the storage system comprising multiple cache levels, each cache level comprising a compressed data partition and an uncompressed data partition, the compressed partition storing compressed data from the uncompressed data partition in a same storage location as in the uncompressed data partition.

30. The system of claim 29 wherein a compressed data partition of a top level cache stores a victim data unit of a top level uncompressed data partition.

31. The system of claim 30 wherein a compressed data partition of each lower level cache stores a victim data unit of a compressed data partition of a next higher level cache.

32. The system of claim 31 wherein the storage system further comprises a storage device coupled to the multiple cache levels, the storage device storing a victim data unit from a compressed data partition of a lowest cache level.

* * * * *